(12) United States Patent
Pook

(10) Patent No.: US 6,471,170 B2
(45) Date of Patent: Oct. 29, 2002

(54) KEYBOARD HOLDER

(75) Inventor: Gus C. Pook, Allendale, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/804,489

(22) Filed: Mar. 12, 2001

(65) Prior Publication Data

US 2002/0125386 A1 Sep. 12, 2002

(51) Int. Cl.⁷ .................................................. A47B 96/06
(52) U.S. Cl. .................. 248/215; 248/227.1; 248/316.4; 248/918; 361/680
(58) Field of Search ................................. 361/683, 680, 361/690–696; 206/308.1; 248/295.11, 231.85, 297.21, 918, 316.4, 215, 227.1, 227.4

(56) References Cited

U.S. PATENT DOCUMENTS

| | | | | |
|---|---|---|---|---|
| 1,209,560 A | * | 12/1916 | Cosner | |
| 2,600,917 A | * | 6/1952 | Petersen | 211/87.01 |
| 3,478,997 A | * | 11/1969 | Goss | 248/201 |
| D298,396 S | * | 11/1988 | Gallego | |
| 5,996,786 A | * | 12/1999 | McGrath | |
| 6,073,899 A | * | 6/2000 | Omrani | |
| 6,152,311 A | * | 11/2000 | German | |
| 6,202,874 B1 | * | 3/2001 | Diamond | |

FOREIGN PATENT DOCUMENTS

| | | | |
|---|---|---|---|
| JP | 4-43416 | * | 2/1992 |
| JP | 5-40546 | * | 2/1993 |
| JP | 8-69342 | * | 3/1996 |
| JP | 2001-84079 | * | 3/2001 |

* cited by examiner

Primary Examiner—Korie Chan
(74) Attorney, Agent, or Firm—Kaplan & Gilman, LLP

(57) ABSTRACT

A keyboard holder to hold a computer keyboard on a computer, is described.

16 Claims, 6 Drawing Sheets

KEYBOARD HOLDER

FIELD

This embodiment relates to a device that may be used in a computer hardware testing process, and more particularly, to a keyboard holder that may conveniently and securely hold a keyboard on a computer frame during a session of testing the components inside the computer.

BACKGROUND

The testing of a computer for the performance of its internal components is usually carried out in a limited space, e.g., on a working table. The cover of the computer is removed so that the testing personnel can gain access to the components inside the computer. With the very limited space, it is often difficult to place the keyboard on the table. As a result, the keyboard is often bound to the computer by rubber bands or ropes. Such a system may be unsafe and inconvenient.

Therefore, there is a need for a device that can hold a keyboard on the computer in a secure way and that is also convenient to use. Furthermore such device should be suitable for various keyboards of different sizes.

BRIEF DESCRIPTION OF THE DRAWINGS

The above features and advantages will be clearer upon reading the following detailed description of the embodiments of the keyboard holder of the invention, with reference to the accompanying drawings in which.

DETAILED DESCRIPTION

Figure 1:
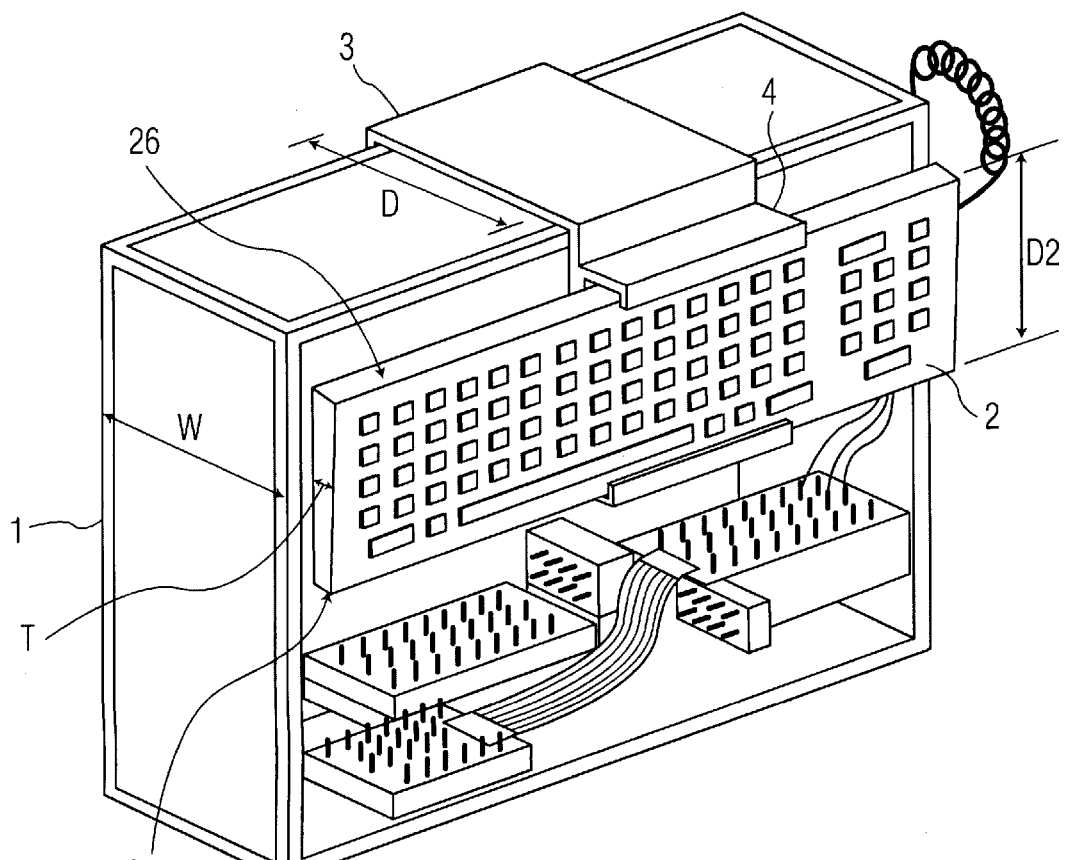
FIG. 1 is an illustrative perspective view of a keyboard holder in accordance with one embodiment of the invention.
Figure 2:
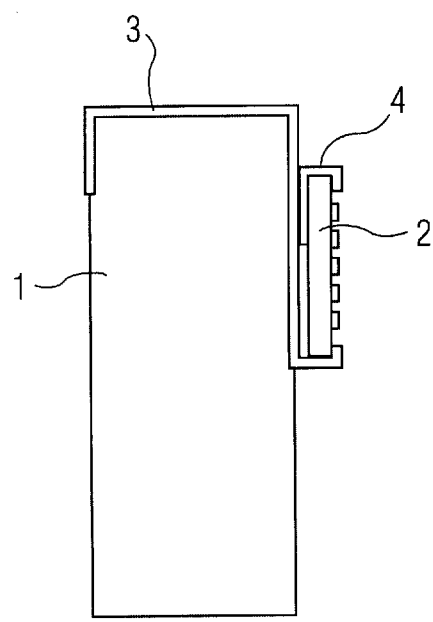
FIG. 2 is a side view of FIG. 1 in accordance with one embodiment of the invention.
Figure 3:
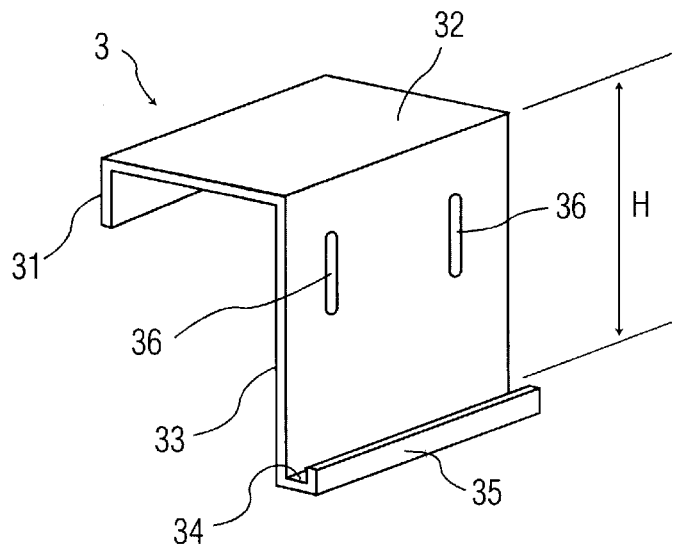
FIG. 3 is a perspective view of a rack in accordance with one embodiment of the invention.

As seen in FIG. 1–3, the keyboard holder of one embodiment of the invention may comprise a rack 3 that is capable of being secured on a computer 1 for holding a keyboard 2 thereon. Rack 3 may have a combination front plate 33 and bottom trough plate 34, that together form an L-shaped supporting member for the keyboard 2. In particular, an edge 2a of keyboard 2, is received upon and held on plate 34. Further, the device may comprise a clamping plate 4 (best seen in FIGS. 4a and 4b), to allow for removable securing of keyboard 2 onto the L-shaped support member. Thus, the keyboard may be held on the front plate and removed therefrom, and the holder (comprising plates 33, 34 and 4), may be used to hold various keyboards of different dimensions.

In order to facilitate the testing of computer 1, it is noted that one of the removable sides of computer 1, will normally be removed during testing, to allow access to the internal components of computer 1. The embodiments of the subject invention are directed to accommodating holding of keyboard 2 above the open side of computer 1, to help facilitate this testing procedure.

Continuing with FIG. 1, due to the possibly limited space, e.g., on a work table (not shown), keyboard 2 may be placed at a top position on the side of computer 1, so that the testing personnel may get access to the internal components of computer 1 from the lower part of the computer (though the open side) while at the same time using keyboard 2 during a testing or repair session.

Figure 4A:
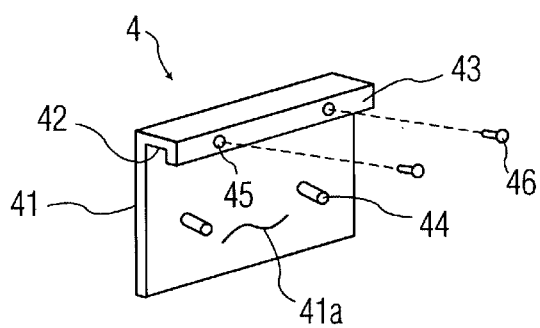
FIGS. 4a and 4b are perspective views of the L-shaped clamping plate that may work cooperatively with a rack in accordance with one embodiment of the invention.
Figure 4B:
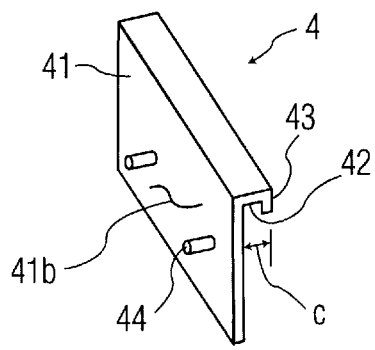

The detailed structure of the rack 3 of FIG. 2 is shown in FIG. 3, while that of the clamping plate 4 is shown in FIGS. 4a and 4b. Similar reference numbers are used throughout the description for designating similar elements.

As shown in FIG. 3, rack 3 may comprise three parts that form a large reverse L-shaped one-piece structure that may follow the contour of computer 1—a back plate 31, a top plate 32 and a front plate 33 (discussed above). As shown in FIG. 4, when rack 3 is secured on computer 1, back plate 31 may abut the back side of computer 1, top plate 32 may rest on the top of computer 1, and front plate 33 may abut the open front side of computer 1. It is appreciated that in order for the keyboard holder assembly of the invention to attach to computer 1, a depth D of top plate 32 (see FIG. 1) shall preferably be substantially the same as a width W of computer 1 (see FIG. 1) so that rack 3 may be held steadily on computer 1 by the combination of plates 31, 32 and 33.

As earlier discussed, the foot part of the L-shaped supporting member; i.e., bottom trough plate 34, has a lip plate 35 extending therefrom (see FIG. 3), to prevent outward movement of edge 2a of keyboard 2.

Referring again to FIGS. 1 and 2, clamping plate 4 is employed to work cooperatively with front plate 33 and trough plate 34, for the purpose of securing keyboard 2 in position. For example as shown in FIG. 4a, a top trough plate 42 may be formed on clamping plate 4 for accommodating a top edge 2b (see FIG. 1) of keyboard 2. When top edge 2b of keyboard 2 is confined in top trough plate 42, outward movement of the edge maybe prevented by a lip plate 43 of clamping plate 4.

As shown in FIGS. 3, 4a and 4b, the flat portion 41 of clamping plate 4 may be connected to the front upper surface of front plate 33 by a slot-stud connection. For example, there may be two slots 36 formed on front plate 33, extending along a height H of front plate 33, as shown in FIG. 3. On a back surface 41b of flat portion 41 of clamping plate 4, there may be two corresponding protruding studs 44 to engage slots 36. The position of studs 44 in slots 36 may be adjustable so as to allow for clamping of top trough plate 42 and bottom trough plate 34 around keyboard 2, as is best shown in FIGS. 1 and 2. After studs 44 are adjusted to their proper position around keyboard 2, studs 44 may be fixed, e.g., by nuts or some other known securing element (not shown), in slots 36.

Lip plate 43 may further be provided with two threaded holes 45 (see FIG. 4a), for accepting therethrough threaded clamp nuts 46. Threaded clamp nuts 46 are used to restrain a back surface of keyboard 2 against front surface 41a of flat portion 41. Clamp nuts 46 help prevent keyboard 2 from moving when a thickness T of keyboard 2 (see FIG. 1), is less than a width C of top trough plate 42 (see FIG. 4b). In this way, keyboard 2 is not loosely restrained against trough plate 43, and the testing personnel may feel more comfortable while striking on the keys of keyboard 2, or carrying keyboard 2 attached to rack 3, for use with another computer. Similarly, lip plate 35 may also be provided with threaded holes (not shown) for accepting threaded clamp nuts (not shown) to tightly fix edge 2a of keyboard 2 in a similar manner to that of edge 2b, so that keyboard 2 is prevented from moving while secured to the keyboard holder of the subject invention.

Figure 5:
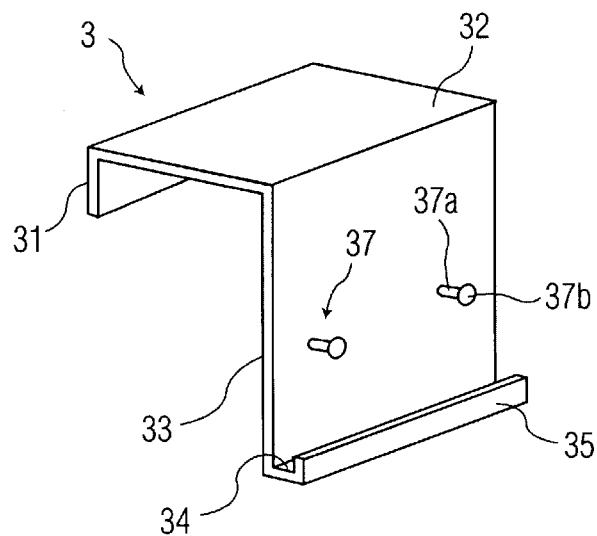
FIG. 5 is a perspective view of a rack in accordance with another embodiment of the invention.
Figure 6:
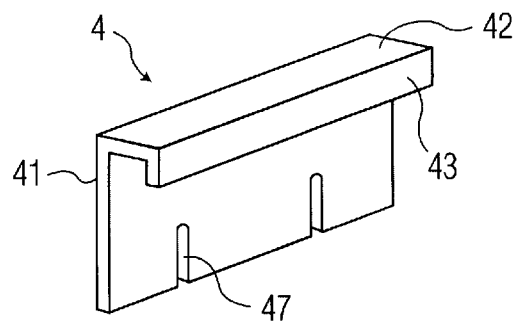
FIG. 6 is a perspective view of a clamping plate in accordance with one embodiment of the invention.
Figure 7:
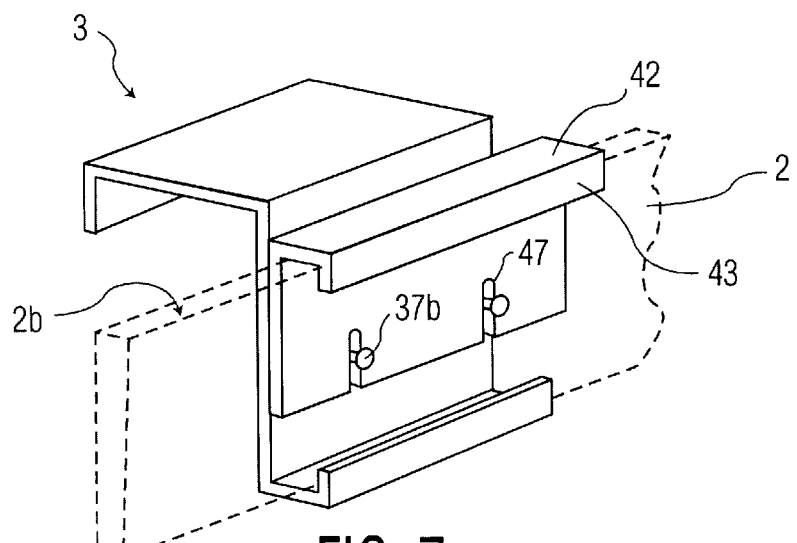
FIG. 7 is a perspective view of a rack and a clamping plate together to hold a keyboard in position in accordance with one embodiment of the invention.

FIGS. 5–7 show an alternative slot-stud connection between front plate 33 and clamping plate 4. Different from the connection in FIGS. 3, 4a and 4b, the slots 47 in this alternative embodiment are formed on flat portion 41 of the clamping plate 4, while studs 37 are protruding from front plate 33. As is clearly shown in FIG. 7, slots 47 on clamping plate 4 are open at the lower end of flat portion 41, which are capable of sliding over stems 37a of studs 37. Caps 37b of studs 37 have larger cross-sectional diameters than the cross-sectional diameter of stems 37a, thus restraining clamping plate 4 in a position for holding edge 2b of keyboard 2, as shown in FIG. 7. In this embodiment, slots 47 of clamping plate 4 may slide over stems 37a of studs 37, until top trough plate 42 rests on edge 2b of keyboard 2.

In the embodiments shown in FIGS. 1–7, the keyboard holder of the present invention is capable of holding different keyboards of various depths D and thicknesses T (see FIG. 1), by adjusting the position of clamping plate 4 on front plate 33 of rack 3, through use of slots 36 or 47, and through use of clamping nuts 46 through lip plate 43 and/or similar clamping nuts through lip plate 35. Finally regarding the embodiment of FIGS. 5–7, it is also anticipated that this embodiment could use clamping nuts 46 through lip: plate 43 (as earlier discussed and described for the embodiment of FIGS. 1–4).

Figure 8:
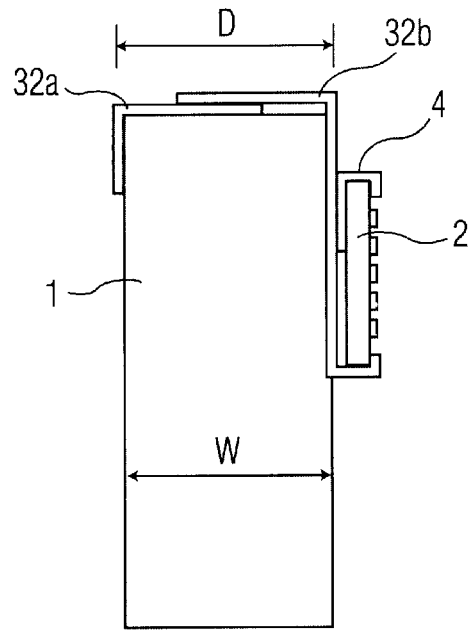
FIG. 8 is a side view of a rack in accordance with yet another embodiment of the invention.
Figure 9:
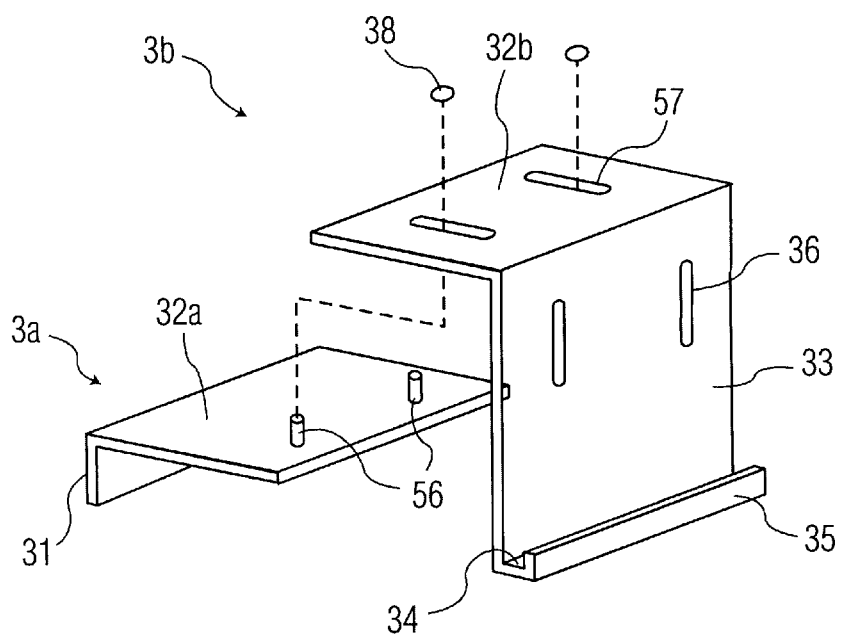
FIG. 9 is a perspective view of a rack in accordance with still another embodiment of the invention.

FIGS. 8 and 9 show a third embodiment of rack 3. This rack 3, however, is adjustable in depth D to match varying widths W of different computers 1. In this embodiment, top plate 32 is a two-piece structure comprising plates 32a and 32b.

Plate 32a has extending therefrom a back plate 31 (which may be the same as that in, the previous embodiments). Plate 32b has extending therefrom a front plate 33, a trough plate 34 and a lip plate 35, that may be all similar to the previous embodiments.

Plates 32a and 32b are capable of being connected together by an adjustable slot-stud structure to form an integrated top plate that is essentially the same as that of top plate 32 shown in the previous embodiments. In particular, there are provided studs 56 protruding from plate 32a and slots 57 on plate 32b, for receipt therein of studs 56. By overlapping plate 32b over plate 32a (as shown in FIG. 9), with studs 56 slidably inserted through slots 57, a depth D of the integrated top plate is adjustable to meet the width W requirements of computer 1. After studs 56 are adjusted to proper position according to width W of computer 1, they may be tightly fixed in slots 57 by means of, e.g., the nuts 38, or other known securing elements.

As an alternative to that shown in FIGS. 8 and 9, slots 57 may be formed on plate a 32a, while studs 56 are provided on plate 32b, for example. Otherwise, this alternate construction would work in substantially the same way.

Figure 10:
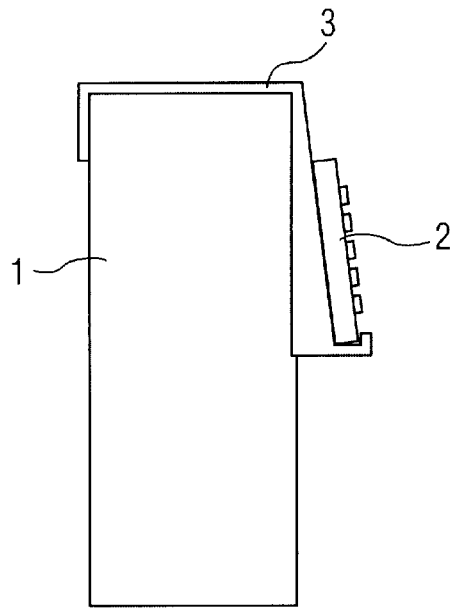
FIG. 10 is a si view of a rack in accordance with one more embodiment of the invention.
Figure 11:
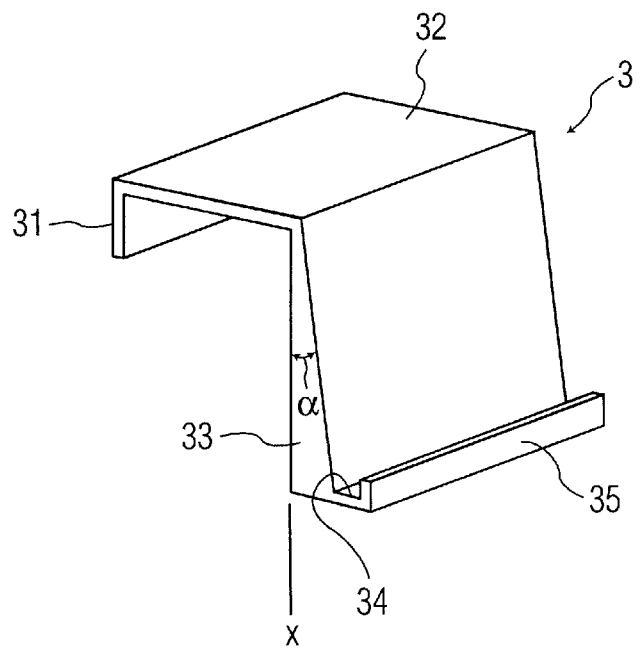
FIG. 11 is a perspective view of a rack in accordance with still one more embodiment of the invention.
Figure 12:
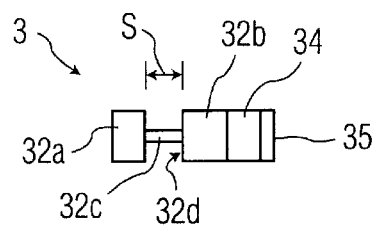
FIG. 12 is a partial top plan view of a rack in accordance with yet one more embodiment of the invention.
Figure 13:
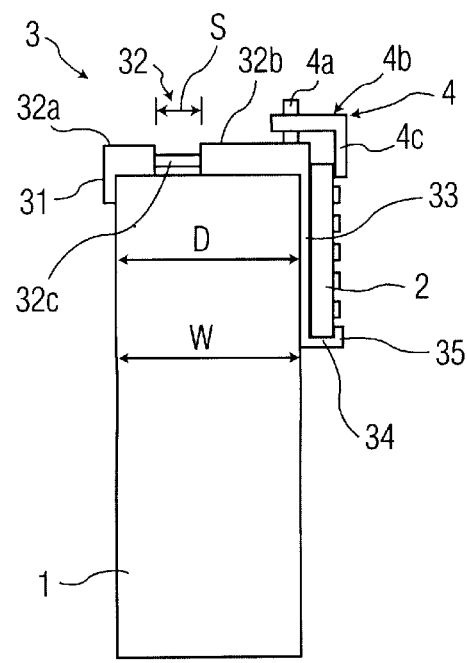
FIG. 13 is a side view of a rack in accordance with the embodiment of FIG. 12.
Figure 14:
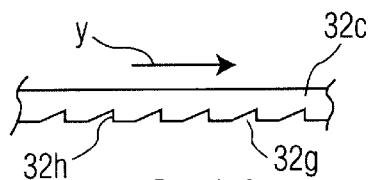
FIG. 14 is a side view of a slideable member corresponding to FIGS. 12 & 13.

FIGS. 10 and 11 show a fourth embodiment of the keyboard holder of the present invention, which only comprises a rack 3 without the clamping plates used in the previous embodiments. In this embodiment, the front plate 33 of rack 3 has a tapering thickness that decreases from the lower end to the top end, thus forming a sloping front surface that assumes some angle to a vertical plane X. Thus, keyboard 2 may be placed on the sloping surface of front plate 33 with its bottom edge (2a) resting on the trough plate 34, as shown in FIG. 10. Because of the sloping surface, there is no need for a clamping plate 4 as used in the previous embodiments, and it is also very convenient to place keyboard 2 on front plate 33 or remove it therefrom. Furthermore, it is more comfortable for the testing personnel to use the keyboard in this slightly sloping orientation.

Rack 3 of FIGS. 10 and 11, may be, for example, molded from a plastic or rubber material so as to easily form the tapering front of front plate 33.

Turning now to FIGS. 12–15, yet another alternate embodiment of the invention is shown. In this embodiment, we again have a computer 1, a rack 3 and a keyboard 2. Rack 3 comprises a top plate 32, having plates 32a and 32b, a front plate 33, a trough plate 34, a lip plate 35 and a clamping plate 4.

The primary difference between this and the other embodiments, concerns the selectively slideable nature of plates 32a and/or 32b around member 32c, and the selectively slideable nature of plate 4 around member 4a.

Starting first with a discussion of plate 32, one way of constructing the assembly may be for member 32c to be fixedly protruding from plate 32a, with a receiving hole 32e therefore in edge 32d of plate 32b. In the alternative, member 32c may protrude from plate 32b, with a receiving hole 32e, in an edge of 32a. In either construction, some manner known in the art to secure member 32c within hole 32e, so as that the depth D separating plates 31 and 33 substantially correspond to the width W of computer 1, will be employed.

Figure 15:
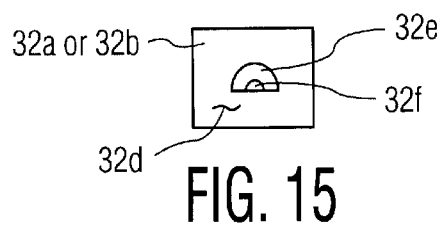
FIG. 15 is a view of plate having a hole for receipt of the slideable member of FIG. 14.

One such securing construction could be that shown in FIGS. 15 and 15. Here, a notched structure for one side of member 32c is used in cooperation with a depressible element 32f, seen in FIG. 15. In particular, as member 32c slides into hole 32e (in the direction "y"), depressible element 32f is depressed. Once a notch 32g is reached, element 32f un-depresses and extends into notch 32g. In this position, member 32c cannot be removed from hole 32e, due to element 32f baring against side 32h of notch 32g. A standard release mechanism is employed for disengagement. Other known methods and constructions may be employed in place of the elements shown in FIGS. 14 and 15, so long as the selectively slideable nature of plates 32a and 32b locking toward each other is maintained.

Regarding the slideable nature of changing plate 4, it is to be understood that top, substantially horizontal plate 4b. has a hole extending there through. A substantially vertically protruding rod 4a is received through the hold in plate 4b, allowing plate 4b to be slideable around rod 4a. In this way, plate 4c of clamping plate 4, is selectively slideable over a portion of keyboard 2, so as to help secure keyboard 2 in place on rack 3.

The above has described in detail several preferred embodiments of the keyboard holder of the invention. It shall, however, be appreciated that numerous modifications and variations may be made to the embodiments shown herein and still fall within the scope of the invention. For example, rack 3 in the embodiment shown in FIGS. 10 and 11 may also incorporate the two-piece structure in FIGS. 8 and 9 so as be useful for computers of varying sizes. A clamping plate 4 (not shown) may also be employed to further secure keyboard 2 when placed on the sloping surface of rack 3 of FIGS. 10 and 11.

What is claimed is:

1. An apparatus, comprising:
   a rack, having:
   a back plate to abut a first vertical side of a computer;
   a front plate to abut a second, opposite vertical side of said computer,
   a top plate integrally bridging between said back plate and said front plate so as to hold said back plate and said front plate in substantially parallel relation, said top plate configured to rest on a top side of said computer, said top side of said computer located between said first and second sides of said computer;
   wherein said front plate of said rack has an outwardly extending trough plate onto which an edge of a keyboard for operating said computer may rest, said trough plate having an upwardly extending lip plate formed thereon; and
   a clamping plate having a top trough plate for restraining another, opposite edge of said keyboard;
   wherein said clamping plate is attached so as to be adjustably positionable on said front plate to grasp said keyboard therebetween; and
   wherein said clamping plate and said trough plate define an outwardly facing opening through which operative elements of said keyboard are accessible for use in testing said computer.

2. Apparatus of claim 1, wherein said back plate and said front plate are substantially parallel to each other while said top plate is substantially perpendicular to both said front plate and said back plate.

3. Apparatus of claim 2, wherein said top plate has a depth that is substantially equal to a width of said computer as said width is defined by the distance between said first and second sides of said computer.

4. Apparatus of claim 1, wherein said rack comprises a plastic material.

5. Apparatus of claim 1, wherein said rack comprises a rubber material.

6. Apparatus of claim 1, wherein at least one hole is formed on a short side of said top trough plate for accepting a bolt for tightly securing said another edge of said keyboard.

7. Apparatus of claim 1 wherein said clamping plate connects with said front plate of said rack at a position such that said keyboard is clamped between said top trough plate and said trough plate.

8. Apparatus of claim 7, further comprising an adjustment mechanism to adjust said position to hold keyboards of varying sizes.

9. Apparatus of claim 8, wherein said adjustment mechanism comprises at least one adjustment slot extending along said front plate of said rack and at least one adjustment stud on said clamping plate that is selectively, adjustably restrained in a position in said adjustment slot.

10. Apparatus of claim 9, wherein said at least one adjustment slot comprises two adjustment slots that are substantially parallel to each other.

11. Apparatus of claim 9, wherein said at least one adjustment stud comprises a bolt and a nut.

12. Apparatus of claim 8, wherein said adjustment mechanism comprises at least one adjustment slot extending along said clamping plate and at least one adjustment stud on said front plate of said rack that is selectively, adjustably restrained in a position in said adjustment slot.

13. Apparatus of claim 12, wherein said at least one adjustment slot is open at a lower end of said clamping plate.

14. Apparatus of claim 13, wherein said at least one adjustment slot comprises two adjustment slots that are substantially parallel to each other and said at least one adjustment stud comprises two adjustment studs.

15. Apparatus of claim 14, wherein said adjustment studs comprise a stem with a cap having radial size larger than a width of said slots.

16. An apparatus, comprising:
   a rack configured to straddle a computer housing such that opposed dependent plates of said rack reside in parallel relation adjacent vertical side panels of said computer;
   a first computer keyboard holding member extending outwardly from one of said plates; and
   a second computer keyboard holding member having a plate extending outwardly therefrom, said second computer keyboard holding member being adjustably positionable on said one of said plates so as to grasp a computer keyboard between said first and second computer holding members; and
   wherein said first and said second computer keyboard holding members define an opening facing away from said computer through which operative elements of said computer keyboard are accessible for testing of said computer.

* * * * *

UNITED STATES PATENT AND TRADEMARK OFFICE
CERTIFICATE OF CORRECTION

PATENT NO. : 6,471,170 B2
DATED : October 29, 2002
INVENTOR(S) : Pook

It is certified that error appears in the above-identified patent and that said Letters Patent is hereby corrected as shown below:

Column 1,
Line 51, before "view", delete "si" and insert -- side --.

Column 4,
Line 5, after "plate", delete "a".
Line 14, after "angle", insert -- $\alpha$ --.

Signed and Sealed this

First Day of June, 2004

JON W. DUDAS
*Acting Director of the United States Patent and Trademark Office*